(12) United States Patent
Sakaue et al.

(10) Patent No.: US 7,746,371 B2
(45) Date of Patent: Jun. 29, 2010

(54) OPTICAL WRITING DEVICE AND IMAGE FORMING APPARATUS

(75) Inventors: Yoshinobu Sakaue, Machida (JP);
Noboru Kusunose, Yokohama (JP);
Hideto Higaki, Yokohama (JP)

(73) Assignee: Ricoh Company, Ltd., Tokyo (JP)

( * ) Notice: Subject to any disclaimer, the term of this patent is extended or adjusted under 35 U.S.C. 154(b) by 74 days.

(21) Appl. No.: 12/219,174

(22) Filed: Jul. 17, 2008

(65) Prior Publication Data
US 2009/0022520 A1 Jan. 22, 2009

(30) Foreign Application Priority Data
Jul. 17, 2007 (JP) .............................. 2007-185457

(51) Int. Cl.
*B41J 2/44* (2006.01)
*G02B 26/10* (2006.01)
(52) U.S. Cl. ........................................ 347/242; 347/257
(58) Field of Classification Search ................ 347/241, 347/242, 245, 256, 257, 263
See application file for complete search history.

(56) References Cited

U.S. PATENT DOCUMENTS

| 7,215,349 | B2 | 5/2007 | Sakaue et al. |
| 2005/0174418 | A1 | 8/2005 | Sakaue et al. |
| 2006/0055769 | A1 | 3/2006 | Yamazaki et al. |
| 2007/0053040 | A1 | 3/2007 | Sakaue et al. |
| 2007/0064087 | A1 | 3/2007 | Matsumae et al. |
| 2007/0153079 | A1 | 7/2007 | Sakaue et al. |
| 2007/0188589 | A1 | 8/2007 | Kusunose et al. |
| 2008/0024851 | A1 | 1/2008 | Sakaue et al. |

FOREIGN PATENT DOCUMENTS

| JP | 2002-311369 | 10/2002 |
| JP | 2005-148128 | 6/2005 |
| JP | 2006-017947 | 1/2006 |
| JP | 2006-091345 | 4/2006 |
| JP | 2006-150836 | 6/2006 |
| JP | 2006-171649 | 6/2006 |
| JP | 2006-227530 | 8/2006 |

*Primary Examiner*—Huan H Tran
(74) *Attorney, Agent, or Firm*—Harness, Dickey & Pierce, P.L.C.

(57) ABSTRACT

An optical writing device that writes electrostatic latent images on an image carrier by irradiating and scanning the image carrier with an optical beam includes an optical element, a support housing configured to support members constituting the optical writing device, a pair of optical-element holding members opposing each other in a principal scanning direction and arranged in the support housing, and a displacing member configured to displace at least one of the pair of optical-element holding members relatively to the support housing on a plane perpendicular to the principal scanning direction. The optical-element holding member is made of a material having a coefficient of linear expansion smaller than that of the support housing.

14 Claims, 9 Drawing Sheets

FIG. 2
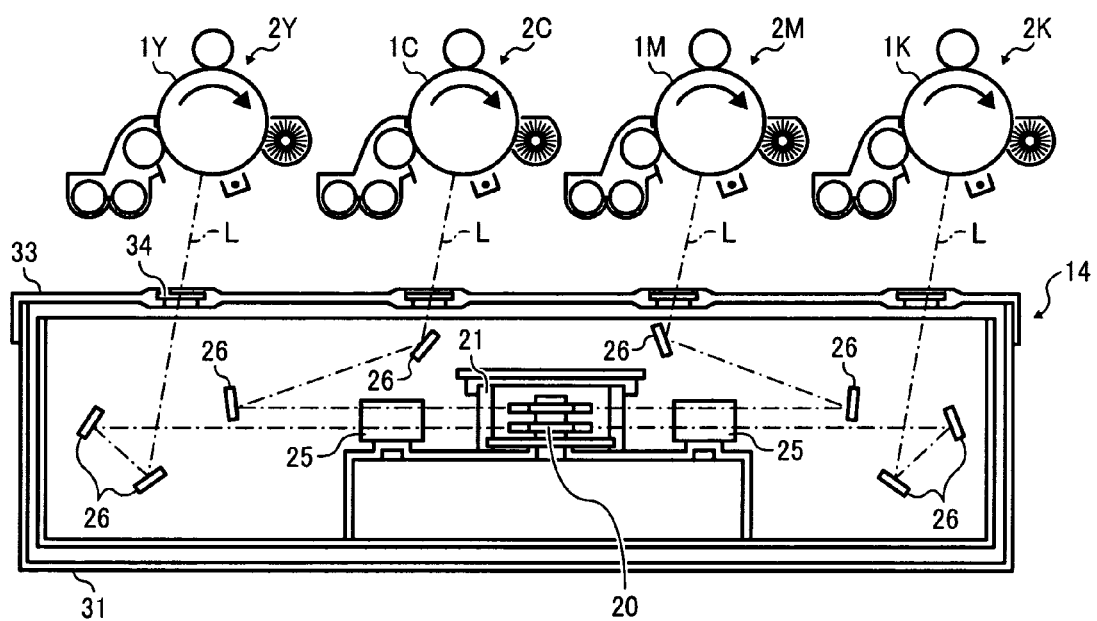
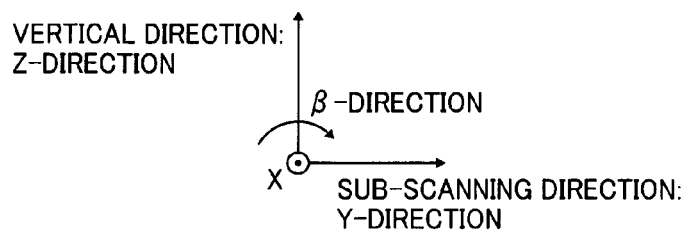

PRINCIPAL SCANNING
DIRECTION:
X-DIRECTION

SUB-SCANNING DIRECTION:
Y-DIRECTION

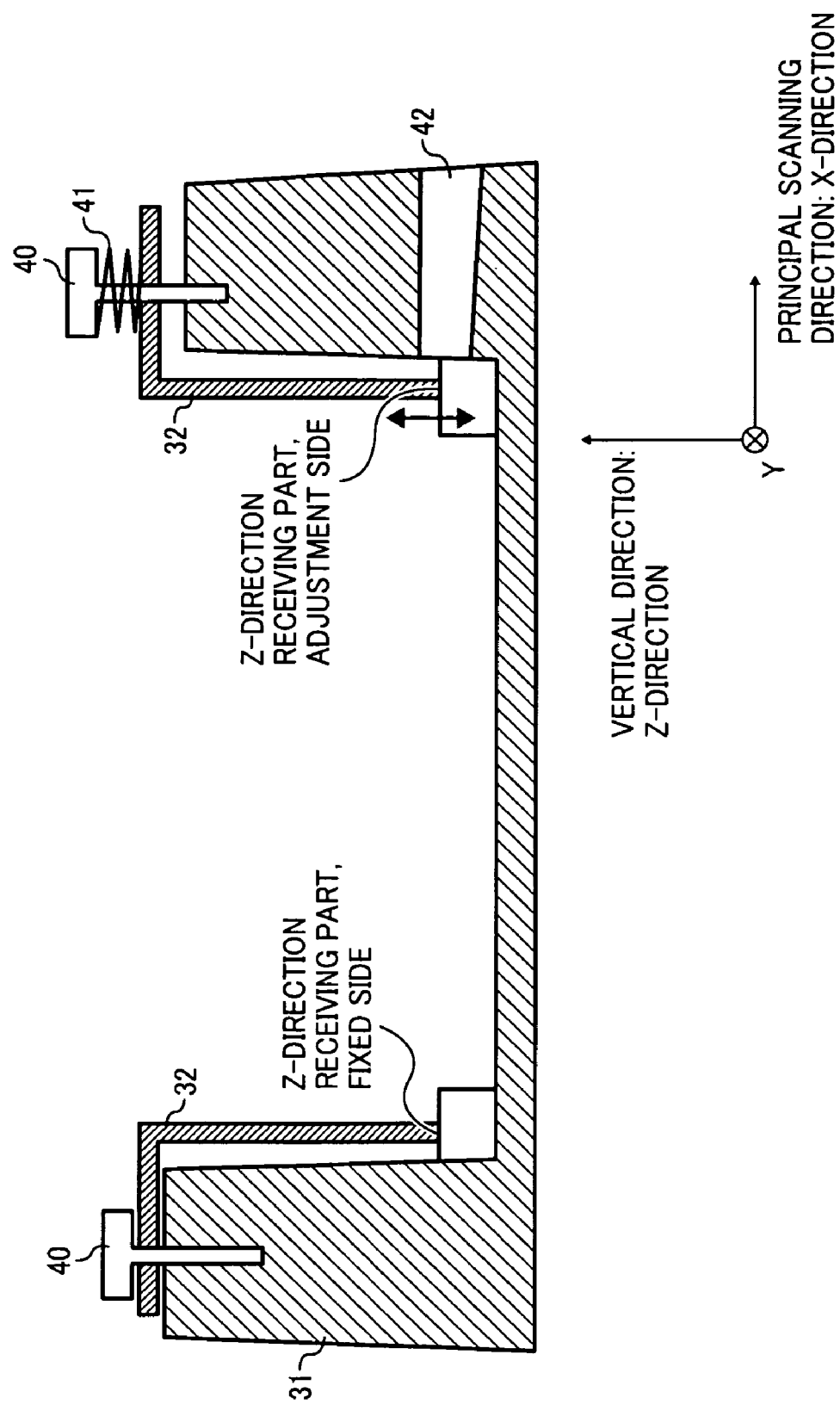

OPTICAL WRITING DEVICE AND IMAGE FORMING APPARATUS

CROSS-REFERENCE TO RELATED APPLICATION

This application claims priority to Japanese Patent Application No. 2007-185457 filed on Jul. 17, 2007 in the Japan Patent Office, the entire contents of which are hereby incorporated by reference herein.

BACKGROUND OF THE INVENTION

1. Field of the Invention

The present invention relates to an image forming apparatus such as a copier, a printer, and a facsimile machine, and an optical writing device installed in the image forming apparatus to write images on an image carrier with an optical beam.

2. Discussion of the Background Art

A tandem color image forming apparatus is widely used. In the tandem color image forming apparatus, images (visible images), each having a different color, are formed on a plurality of latent image carriers so as to form full-color images by overlapping these images. The tandem color image forming apparatus includes an optical writing device mounted thereon for forming the visible images. The optical writing device forms latent images on each latent image carrier by irradiating the latent image carrier with an optical beam corresponding to image information and scanning the optical beam. Then, the optical writing device obtains the visible images by developing the latent image formed on each latent image carrier.

The above-mentioned optical writing device generally includes optical elements, such as a lens and a mirror, for directing light emitted from a light source to a predetermined position. The optical elements may include a polygon mirror for deflecting and scanning with the light from the light source to serve as principal scanning-line deflection means. In addition, the optical elements may include a plurality of lenses for focusing the light beam deflected by the polygon mirror on the surface of a latent image carrier which is a light-irradiation target.

In such an optical scanning device, during fabrication certain tolerances may appear in image plane curvature characteristics and positional accuracies of the optical elements. In addition, because a motor that drives the polygon mirror generates heat, various constituent elements of the optical writing device may also be thermally deformed. Moreover, due to changes in weight balance and circumstance of the image forming apparatus, torsion of the image forming apparatus and the optical writing device or torsion of the latent image carrier may be produced during mounting. For these reasons there arises a problem of fluctuation in position and angle between the optical elements, so that the scanning position of the light beam on the latent image carrier fluctuates. Also, for the above-mentioned reasons, a problem arises in that the scanning line of the light beam on the surface of the latent image carrier is curved or inclined.

Due to the problems mentioned above, color misalignment is produced in the full-color images formed by overlapping the images formed on each latent image carrier.

In the problems mentioned above, the positions and attitudes of the lens and the mirror largely affect the relative inclination misalignment of the scanning line. Hence, it is generally required to correct the position and attitude of the optical element (the lens or the mirror) provided for each-color image forming station of the color image forming apparatus. On the other hand, in order to suppress the relative misalignment of the scanning line, it is necessary to structure an optical housing with high accuracies for holding a number of optical elements. Such management of such fabrication tolerance complicates production of the optical housing, so that it is difficult to manage and maintain the production line.

Therefore, an optical writing device has been proposed in which part of the optical elements is held to a punched plate other than a housing having the entire optical elements arranged therein. In this optical writing device, a two-member structure is disclosed in that optical elements are held by a pair of holding members.

Similar optical writing devices capable of improving performance by employing a most suitable material for the function to be achieved have been proposed. Furthermore, there is an optical writing device capable of removing the effect of the thermal expansion/contraction of the two members and an optical writing device in which the first holding member is also made of a plate for increasing the rigidity.

However, in these related arts, if the holding member is divided into two members, problems of error accumulation and relative misalignment remain. In one optical writing device, the torsion of the device itself can be desirably corrected. In this case, however, depending on the structure of the optical writing device, unnecessary torsion may be inadvertently produced.

SUMMARY OF THE INVENTION

This patent specification describes an optical writing device that writes electrostatic latent images on an image carrier by irradiating and scanning the image carrier with an optical beam, and includes an optical element, a support housing configured to support members constituting the optical writing device, a pair of optical-element holding members opposing each other in a principal scanning direction and arranged in the support housing, and a displacing member configured to displace at least one of the pair of optical-element holding members relatively to the support housing on a plane perpendicular to the principal scanning direction. The optical-element holding member is made of a material having a coefficient of linear expansion smaller than that of the support housing.

This patent specification further describes an image forming apparatus that includes an optical writing unit including the above-described optical writing and configured to write electrostatic latent images on an image carrier by irradiating and scanning the image carrier with an optical beam using the optical element, and an image forming unit configured to form images by developing the electrostatic latent images on the image carrier and transferring the developed images onto a recording medium.

BRIEF DESCRIPTION OF THE DRAWINGS

A more complete appreciation of the invention and many of the advantages thereof may be obtained as the same become better understood by reference to the following detailed description when considered in connection with the accompanying drawings, wherein:

FIG. 2 is a schematic sectional view of the optical writing device according to the embodiment;

FIG. 6 is an explanatory view for illustrating the relation between the optical element holding member and a support housing according to the embodiment;

DETAILED DESCRIPTION OF THE INVENTION

Figure 1:
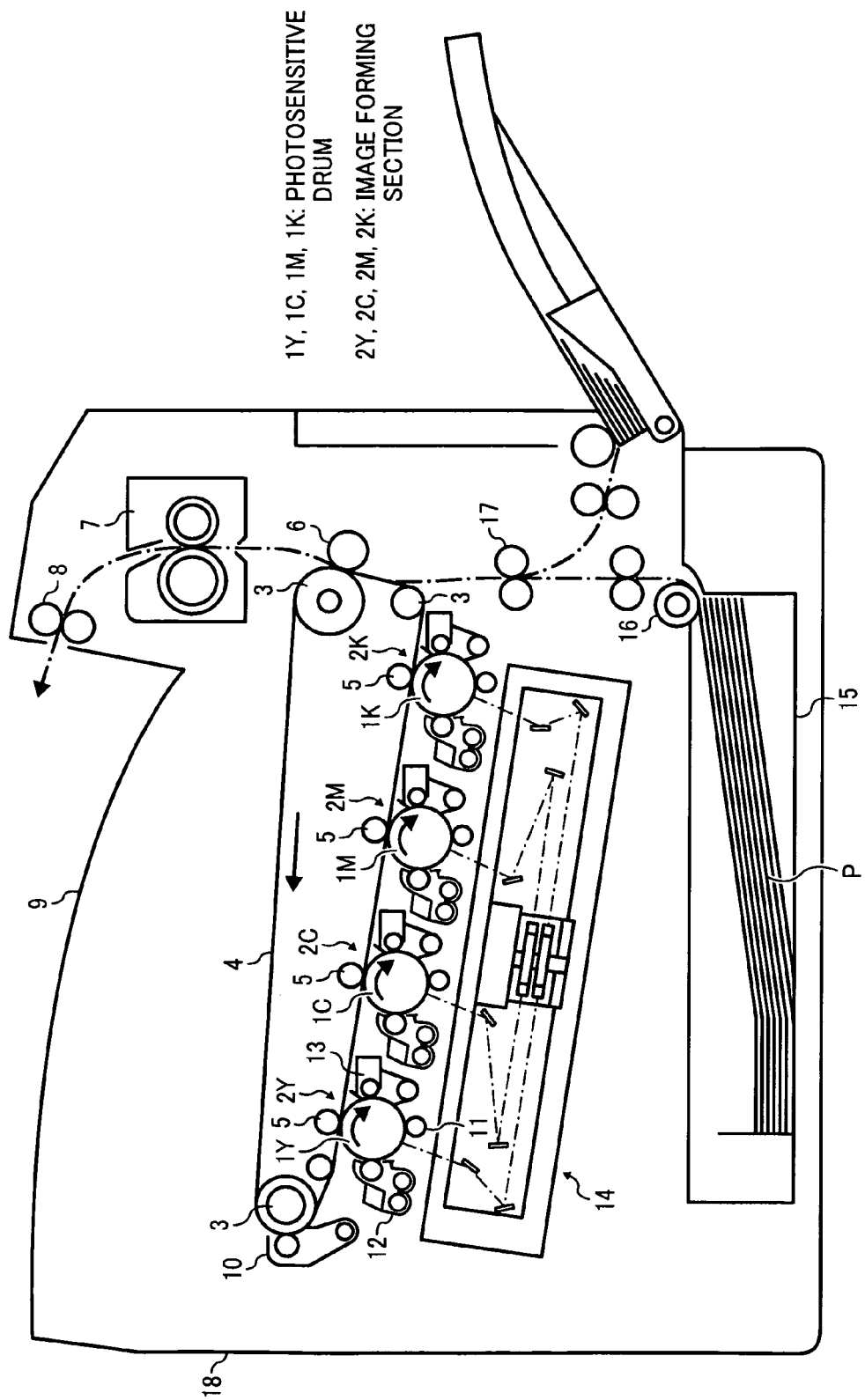
FIG. 1 is an entire structural drawing of an image forming apparatus according to an embodiment and having an optical writing device according to the present invention mounted thereon.

In describing the embodiments illustrated in the drawings, specific terminology is employed for the purpose of clarity. However, the disclosure of this patent specification is not intended to be limited to the specific terminology so used, and it is to be understood that substitutions for each specific element can include any technical equivalents that operate in a similar manner and achieve a similar result.

Referring now to the drawings, wherein like reference numerals designate identical or corresponding parts throughout the several views, a description will now be given of embodiments of the present invention.

FIG. 1 is an entire structural drawing of an image forming apparatus according to an embodiment and having an optical writing device according to the present invention mounted thereon.

The image forming apparatus is a full-color image forming apparatus having a plurality (four, according to the embodiment) of photosensitive drums, 1Y (yellow), 1C (cyan), 1M (magenta), and 1K (black), arranged in tandem as image carriers. These photosensitive drums 1Y, 1C, 1M, and 1K constitute each-color image forming sections (each-color image forming stations) 2Y, 2C, 2M, and 2K, respectively. These image forming sections 2Y, 2C, 2M, and 2K form images with colors of yellow, cyan, magenta, and black, respectively.

The image forming apparatus is provided with an intermediate transfer belt 4 rotatably supported by three support rollers 3. The image forming sections 2Y, 2C, 2M, and 2K are sequentially arranged along a bottom side of the intermediate transfer belt 4 at predetermined intervals in a moving direction along a lower side of the intermediate transfer belt 4, in that order from an upstream side as indicated by an arrow.

In forming full-color images, toner images for each color are formed on the photosensitive drums 1Y, 1C, 1M, and 1K respectively provided in the image forming sections 2Y, 2C, 2M, and 2K, as will be described later. Then, the toner images for each color are sequentially transferred and overlapped on the intermediate transfer belt 4 in accordance with the rotation of the intermediate transfer belt 4 by primary transfer rollers arranged to oppose the photosensitive drums 1Y, 1C, 1M, and 1K with the intermediate transfer belt 4 therebetween.

The toner images transferred on the intermediate transfer belt 4 by overlapping four-color images with each other are collectively transferred on a recording medium P that is a recording medium. The transfer of the toner images onto the recording medium P is executed by introducing the recording medium P into the nip between the support roller 3 and a secondary transfer roller 6, which are shown on the right side of FIG. 1. After the transfer, the recording medium P passes through a fixing device 7 so as to fix the image thereon, after which the recording medium P is then discharged onto a discharge tray 9 by discharge rollers 8.

In order to accommodate a monochrome (black) image forming mode, the primary transfer roller 5 of the photosensitive drum 1K is always in contact with the intermediate transfer belt 4, whereas the primary transfer rollers 5 of the other photosensitive drums 1Y, 1C, and 1M are brought into and out of contact with the intermediate transfer belt 4 by the operation of movable tension rollers. For removing residual toner on the intermediate transfer belt 4, a cleaning device 10 is arranged at the support roller 3, which is shown on the left side of FIG. 1, to oppose the intermediate transfer belt 4.

Referring to FIG. 1, in the image forming sections 2Y, 2C, 2M, and 2K, only the toner color is different; the mechanical configuration and an image forming process are identical. Hence, components other than the photosensitive drums are designated by identical reference characters. In the description below, the configuration and the image forming process of one image forming section 2Y will be described.

Around the image forming section 2Y, a charging roller 11, an illuminated position of a light beam L, a toner developing unit 12, the primary transfer roller 5, and a cleaning unit 13 are sequentially arranged in the clockwise rotational direction. The charging roller 11 charges the photosensitive drum 1Y. The illuminated position of the light beam L is a position on the photosensitive drum 1Y where the light beam L is illuminated as writing light.

The light beam L is emitted from an optical writing device 14. The optical writing device 14 is provided with a semiconductor laser as a light source, a coupling lens, an fq lens, a toroidal lens, a mirror, and a rotatable polygonal mirror. The optical writing device 14 is configured to emit the light beam L for each color toward each photosensitive drum, and the writing position on the photosensitive drum 1Y is irradiated with the light beam L to form electrostatic latent images as will be described later.

The developing unit 12 of the image forming section 2Y contains yellow toner. The image forming section 2Y develops the latent images formed on the surface of the photosensitive drum 1Y into yellow images using the toner accommodated therein. The other forming sections contain toner for the respective colors (C, M, and K) and develop the latent images into each-color images using the accommodated toner for each color.

In forming an image, the photosensitive drum 1Y is uniformly charged due to the rotational friction with the charging roller 11. Then, by being irradiated with the light beam L including yellow-image information at the writing position, an electrostatic latent image is formed on the photosensitive drum 1Y. The latent image is developed on the photosensitive drum 1Y with yellow toner while passing through the toner developing unit 12.

The developed yellow toner image on the photosensitive drum 1Y is transferred to the intermediate transfer belt 4 with the primary transfer roller 5. On the yellow toner image on the intermediate transfer belt 4, cyan, magenta, and black toner images are sequentially transferred to an superimposed on one another at the following image forming sections 2C, 2M, and 2B, respectively, thereby forming full-toner images on the intermediate transfer belt 4.

With the same timing of the full-toner images on the intermediate transfer belt 4 reaching the secondary transfer roller 6, the recording medium P is conveyed to the secondary transfer roller 6. The recording medium P is fed from a paper feeding section 15 by a paper feeding roller 16. The movement of the recording medium P is timed so that the recording medium P reaches the secondary transfer roller 6 by register rollers 17. By the operation of the register rollers 17, the recording medium P is conveyed to the secondary transfer roller 6 at the same time as the full-toner images on the intermediate transfer belt 4 reach the secondary transfer roller 6. The full-toner images are collectively transferred onto the recording medium P by being introduced into the nip between the support roller 3 and the secondary transfer roller 6.

Residual toner remaining on the photosensitive drum 1Y after the toner images are transferred to the intermediate transfer belt 4 is removed by the cleaning unit 13. Then, the photosensitive drum 1Y is discharged by a discharging lamp in preparation for the next image forming operation. Similarly, on the intermediate transfer belt 4, residual toner, etc., is removed by the cleaning device 10.

In the image forming apparatus, toner images on each photosensitive drum are once transferred onto the intermediate transfer belt 4 to overlap with each other, after which the overlapped toner images are collectively transferred onto the recording medium P. Alternatively, instead of the intermediate transfer belt 4, a recording paper conveying belt may be provided. In this case, the recording medium P is conveyed by the recording paper conveying belt. In the process of conveyance, color toner images are sequentially transferred onto the recording medium P from each photosensitive drum to overlap with each other, enabling full-color images to be formed.

An optical writing device according to the embodiment will now be described.

Figure 3:
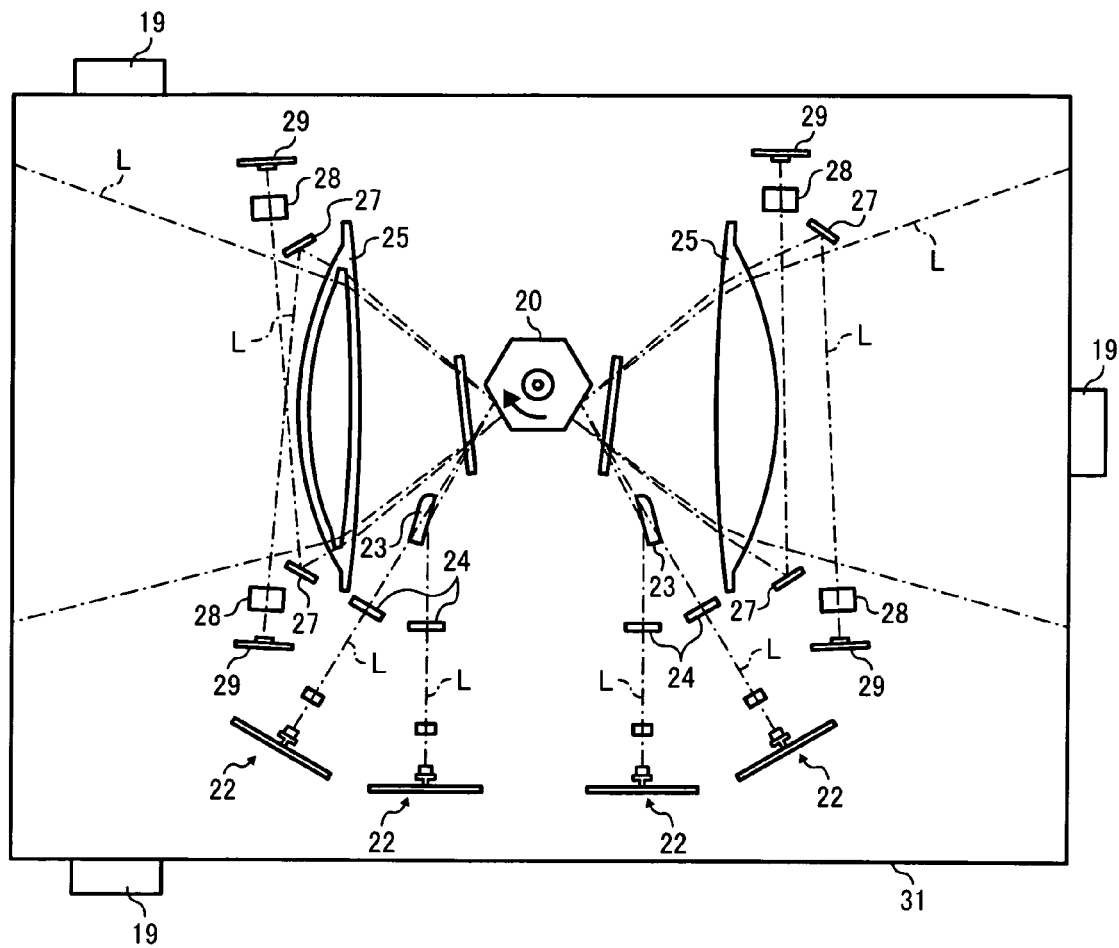
FIG. 3 is a plan view of the optical writing device according to the embodiment shown in FIG. 2.
Figure 4:
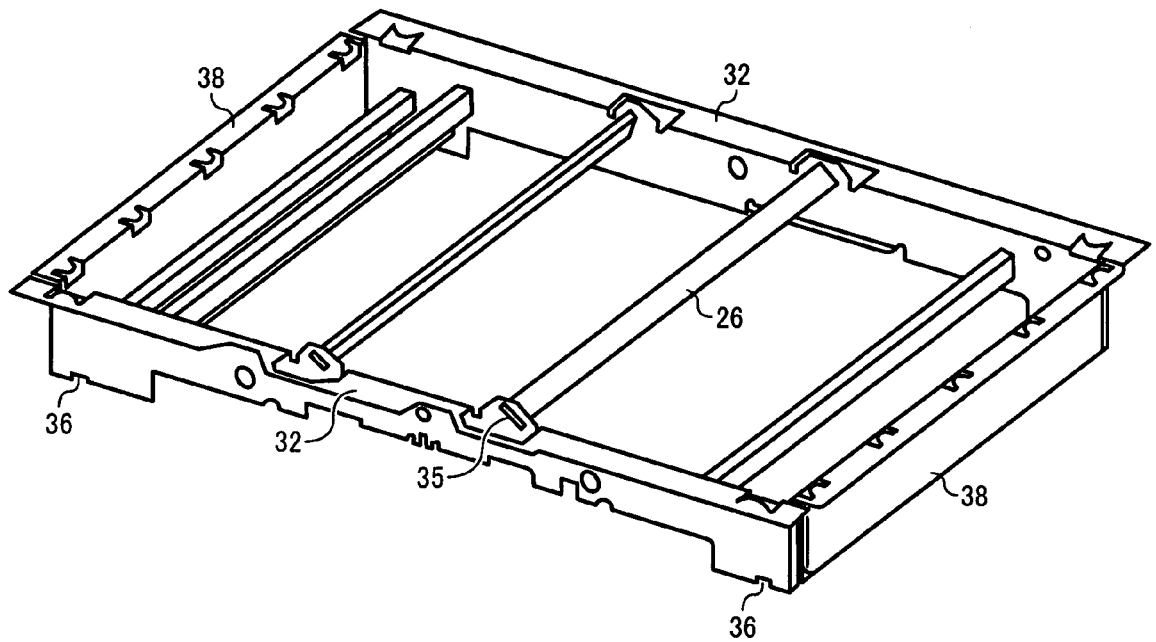
FIG. 4 is an entire perspective view of an optical element holding member according to the embodiment.

FIG. 2 is a schematic sectional view of the optical writing device according to the embodiment. FIG. 3 is a plan view of the optical writing device shown in FIG. 2. FIG. 4 is an entire perspective view of an optical element holding member according to the embodiment.

The optical writing device 14 according to the embodiment is for tandem image forming, and employs a scanning lens system. In addition, the device can correspond to both the scanning lens and scanning mirror systems.

The optical writing device 14 includes a polygon scanner 20 and optical elements, such as various reflection mirrors and various lenses. The polygon scanner 20 is arranged inside the optical writing device 14 substantially at its center. The polygon scanner 20 includes an upper polygon mirror fixed to a motor rotating shaft of a polygon motor, not shown, and a lower polygon mirror. Furthermore, the polygon scanner 20 is surrounded with a soundproof glass 21.

As shown in FIG. 2, the configurations inside the optical writing device 14 correspond to the image forming sections 2Y, 2C, 2M, and 2K, respectively. For example, an M-optical system and a K-optical system inside the optical writing device 14 are arranged on the right side of the polygon scanner 20 in FIG. 2. Also, a Y-optical system and a C-optical system inside the optical writing device 14 are arranged on the left side of the polygon scanner 20 in FIG. 2. The C- and Y-optical systems are arranged symmetrically with the M- and K-optical systems about the rotating shaft of the polygon motor.

As shown in FIG. 3, the optical writing device 14 also includes light source units 22, each having a semiconductor laser configured to emit the light beam L and a collimator lens. The light source units 22 are arranged in the optical writing device 14 to correspond to the photosensitive drums 1K, 1M, 1C, and 1Y, respectively. In the optical writing device 14, the lower light beam L to be directed onto the lower polygon mirror is deflected by a turn-back mirror 23 disposed at an intermediate position along the lower light beam L optical path such that the light beam L proceeds toward the polygon scanner 20, while the upper light beam L proceeds straight toward the upper polygon mirror. By such a configuration, the lower and upper light beams L linearly condense at the vicinities of the respective mirror reflection planes.

An imaging lens (cylinder lens) 24 is arranged along each optical path between each light source unit 22 and the polygon scanner 20. A scanning lens (fq lens) 25 and a turn-back mirror 26 are arranged along an optical path between the polygon scanner 20 and each of the photosensitive drums 1K, 1M, 1C, and 1Y.

The two upper and lower light beams L emitted from the respective light source units 22 pass through the respective scanning lenses 25. Then, the light beams L are reflected by turn-back mirrors 27 to pass through synchronizing optical elements 28 and be directed onto beam sensors 29, thereby outputting a synchronization signal to start scanning.

In the optical writing device 14 according to the embodiment, a holding member for holding the optical elements is composed of two members. Specifically, the optical elements shown in FIG. 3 (the light source units 22, the imaging lenses 24, the scanning lenses 25, and the polygon scanner 20) are supported within a support housing 31, while the residual turn-back mirrors 26 are held by an optical element holding member 32 shown in FIG. 4. The scanning lenses 25 may also be held by the optical element holding member 32 and not by the support housing 31.

As shown in FIG. 2, the support housing 31 with an opened top plane includes a dustproof lid cover 33 for optical elements. The support housing 31 and the lid cover 33 are made of a resin to have an inexpensive and light-weight structure. The lid cover 33 is provided with four openings, each having a dustproof glass 34 that allows the light beam L to penetrate therethrough as well as restricts dust from entering therein.

Furthermore, as shown in FIG. 3, connection parts 19 are formed on lateral faces of the support housing 31 to be connected to frames, not shown, of a body case 18 of the image forming apparatus shown in FIG. 1. The optical writing device 14 is connected to the body case 18 by fitting the connection parts 19 into depressions formed on the frames of the body case 18. Alternatively, the connection parts 19 may also be formed on all four sides of the support housing 31, depending on the shape and structure of the body case 18.

The optical element holding member 32, as shown in FIG. 4, is a pair of metallic members arranged substantially parallel to each other. The optical element holding member 32 includes holes 35 into which the turn-back mirrors 26 are inserted and positioning parts 36 for positioning the holding member relative to the support housing 31.

Figure 5A:
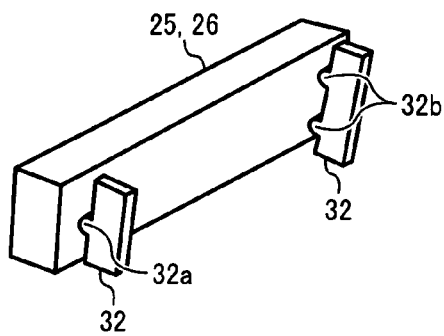
FIGS. 5A and 5B are explanatory views for illustrating the optical element holding member and a displacement member according to the embodiment.
Figure 5B:
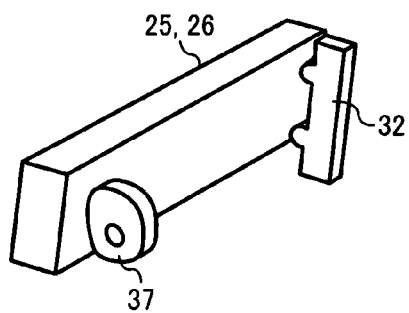

As shown in FIG. 5A, one of the pair of the optical element holding members 32 is provided with a one-point support part 32a formed thereon. The other of the pair of the optical element holding members 32 is also provided with a two-point support part 32b formed thereon. The one-point support part 32a is an optical element adjustment member for adjusting the inclination of the turn-back mirror 26 for adjusting the inclination of the scanning line. The two-point support part 32b is provided such that the turn-back mirror 26 is not displaced. As shown in FIG. 5B, an eccentric cam 37 may also be provided as the optical element adjustment member. As for the optical element adjustment member, not only in one of the optical element holding members 32 as shown in FIG. 5A, but also it may be provided in both the optical element holding members 32.

As shown in FIG. 4, it is preferable that the pair of the optical element holding members 32 have a frame structure, such that the optical element holding members 32 are connected together with cross-linking members 38 to be unitized, thereby improving ease of handling and assembly of parts constituting the optical writing device 14.

A configuration according to the embodiment in that at least one of the optical element holding members 32 is displaced on the plane in directions (Y- and Z-directions) perpendicular to a principal scanning direction (X-direction) will now be described in detail.

As shown in FIG. 6, both the optical element holding members 32 are accommodated within the support housing 31. The optical element holding member 32 on the fixed side (on the left side of FIG. 6) is fixed with a fastening member 40, such as a screw, while the optical element holding member 32 on the adjustment side (on the right side of FIG. 6) is displaceably held by the fastening member 40, with an elastic member 42 therebetween.

The optical element holding members 32 are accommodated within the support housing 31, so that various optical elements held by the optical element holding members 32 are retained by the support housing 31 in a dustproof state. The support housing 31 may be preferably provided with an access hole 42 for accessing the optical element adjustment member, such as the one-point support part 32a and the eccentric cam 37, from the outside.

Embodiments of a displacement member in the optical writing device will now be described. The displacement member according to the embodiment relatively displaces the attitude of the optical element holding members 32 opposing each other.

Figure 7A:
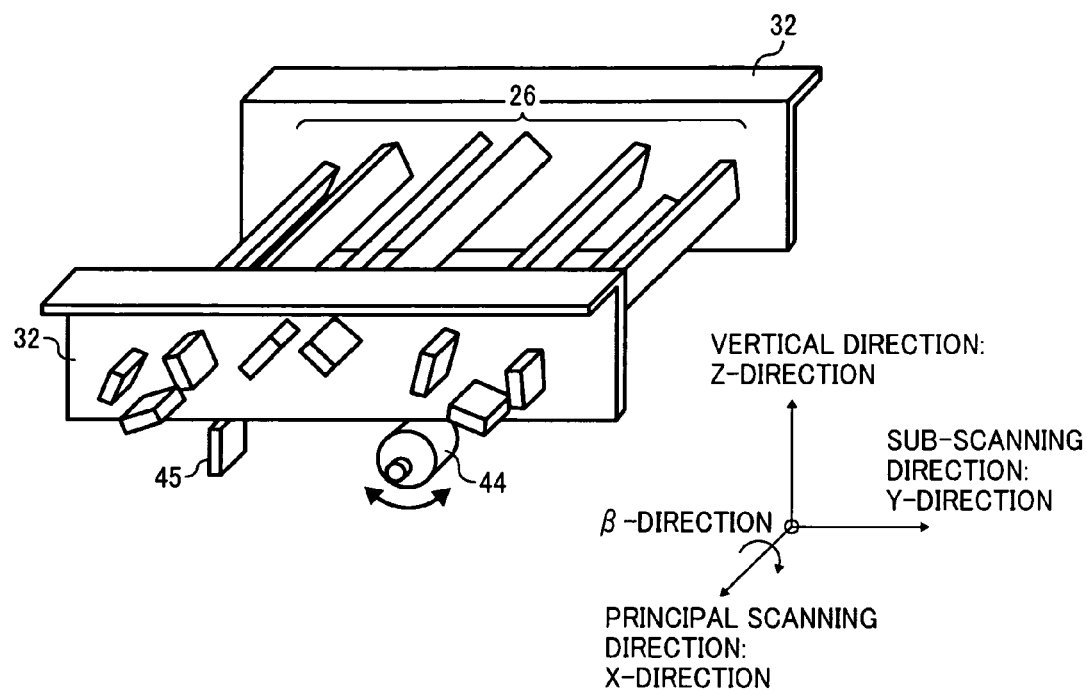
FIG. 7A is a perspective view illustrating the displacement member for displacing the attitude of the optical element holding member according to the embodiment.

FIG. 7A is a drawing of an example in which an eccentric cam 44 is provided as the displacement member. In the example of FIG. 7A, the eccentric cam 44 and a fixed receiving part 45 are provided for supporting the optical element holding member 32 on the adjustment side. Then, by rotating the eccentric cam 44, the optical element holding member 32 on the adjustment side is rotated (in b-direction) on the plane perpendicular to the principal scanning direction. The optical element holding member 32 is rotated about its part supported by the fixed receiving part 45 by the rotation of the eccentric cam 44. Hence, the center of rotation of the optical element holding member 32 can be easily displaced by displacing the position of the fixed receiving part 45 in the sub-scanning direction (Y-direction).

Figure 8A:
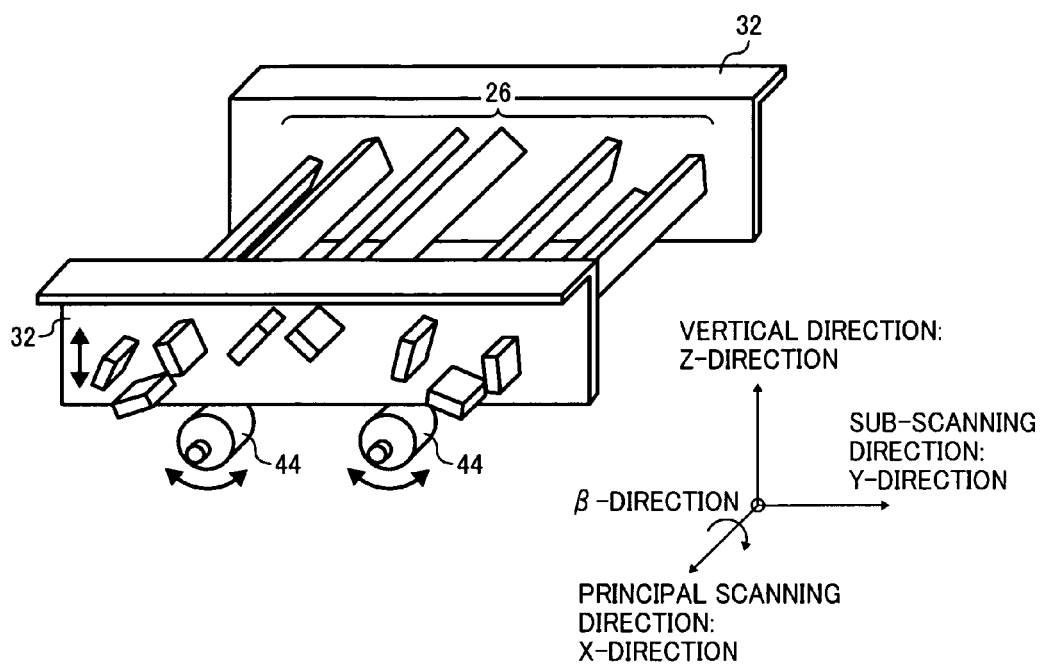
FIG. 8A is a perspective view illustrating the displacement member for displacing the attitude of the optical element holding member according to the embodiment.

FIG. 8A is a drawing of an example in which two eccentric cams 44 are provided as the displacement member. In the example of FIG. 8A, the two eccentric cams 44 with the same shape are arranged on the bottom side of the optical element holding member 32. By the simultaneous rotation of both the eccentric cams 44, the optical element holding member 32 is displaced in the vertical direction (Z-direction). By rotating only one of the eccentric cams 44, the optical element holding member 32 on the adjustment side is rotated (in b-direction) on the plane perpendicular to the principal scanning direction.

Figure 9A:
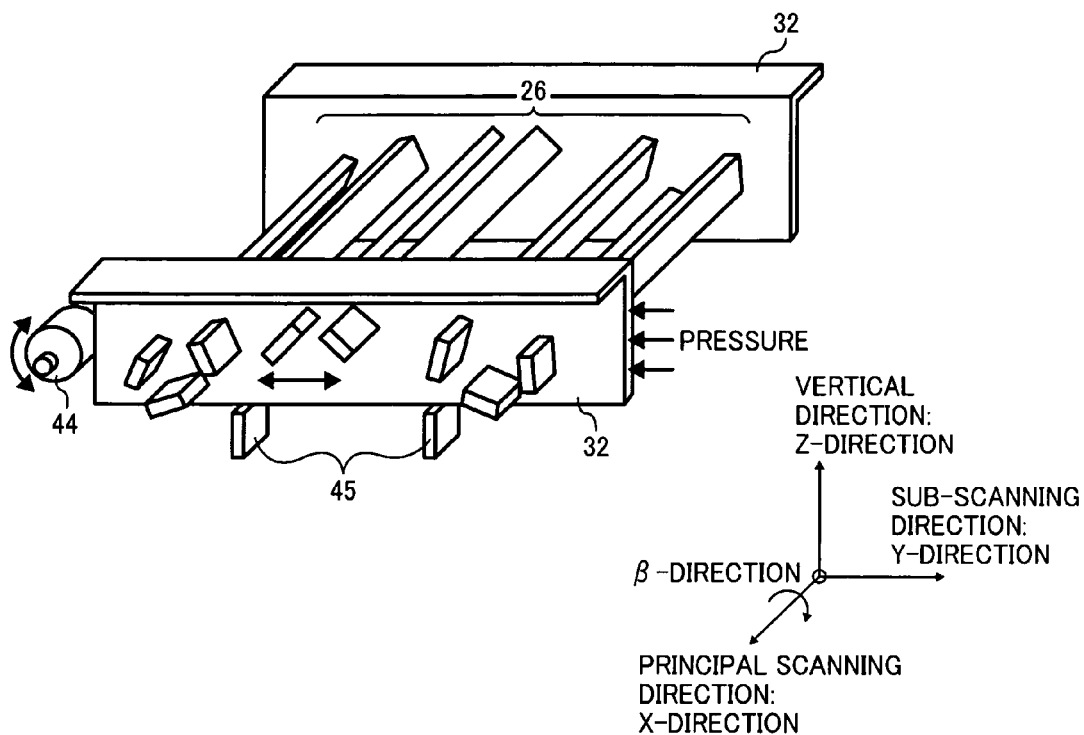
FIG. 9A is a perspective view illustrating the displacement member for displacing the attitude of the optical element holding member according to the embodiment.

FIG. 9A is a drawing of an example in which the eccentric cam 44 is provided as the displacement member at a position different from the example of FIG. 7A. In the example of FIG. 9A, the eccentric cam 44 is arranged on the side of the optical element holding member 32 on the adjustment side in the sub-scanning direction. A plurality of the fixed receiving parts 45 are also provided for supporting the optical element holding member 32 on the adjustment side. Then, by rotating the eccentric cam 44, the optical element holding member 32 is displaced in the sub-scanning direction (Y-direction).

Figure 7B:
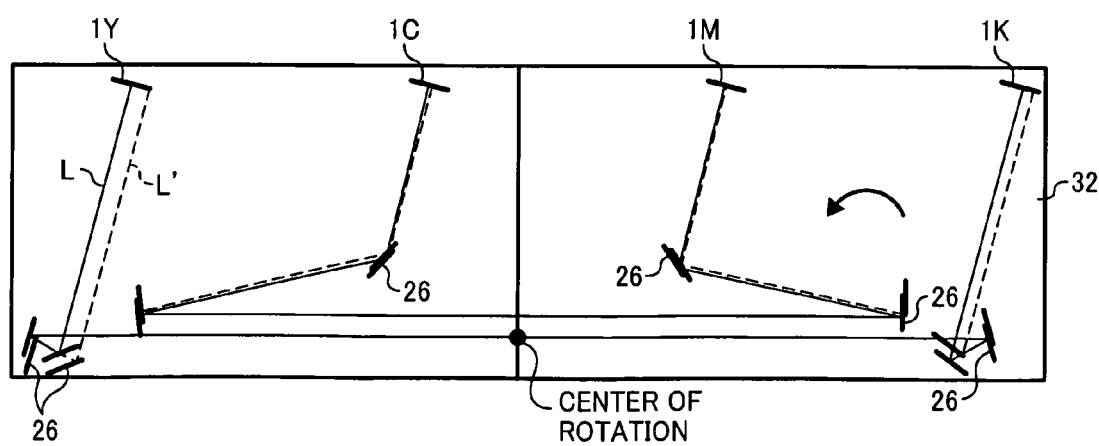
FIG. 7B is an explanatory view illustrating the shift of a light beam when the optical element holding member is displaced.
Figure 8B:
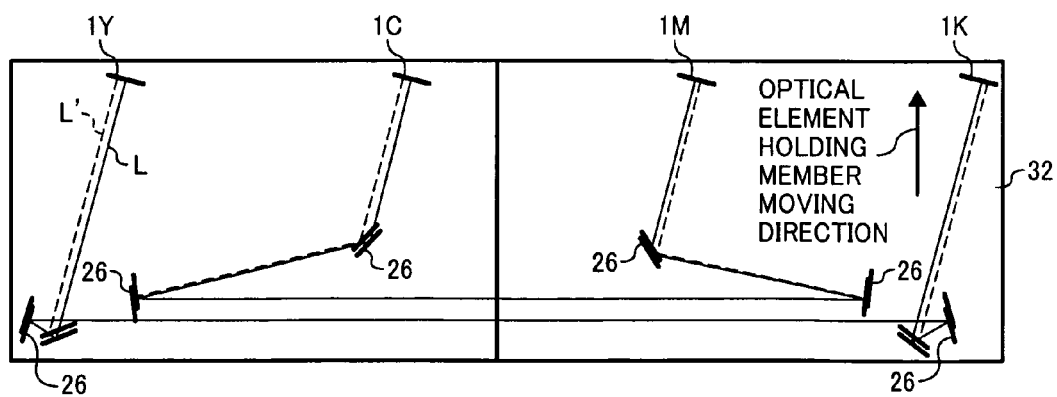
FIG. 8B is an explanatory view illustrating the shift of a light beam when the optical element holding member is displaced.
Figure 9B:
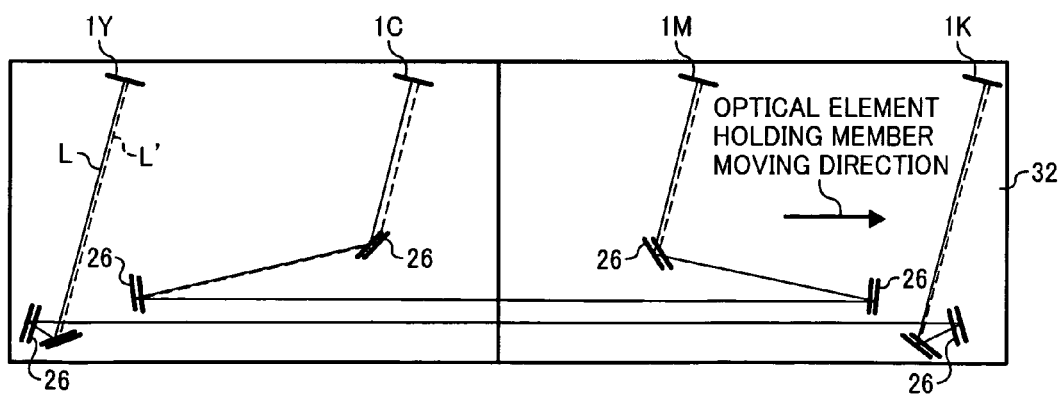
FIG. 9B is an explanatory view illustrating the shift of a light beam when the optical element holding member is displaced.

FIGS. 7B, 8B, and 9B are drawings showing the state of the shifting light beam L (the shifted light beam L') when the attitude of the optical element holding member 32 is changed (displaced). The shift amount of the light beam L can be easily calculated geometrically. Thus, the inclination of the scanning line approaching the photosensitive drum 1 can be readily obtained.

Figure 10:
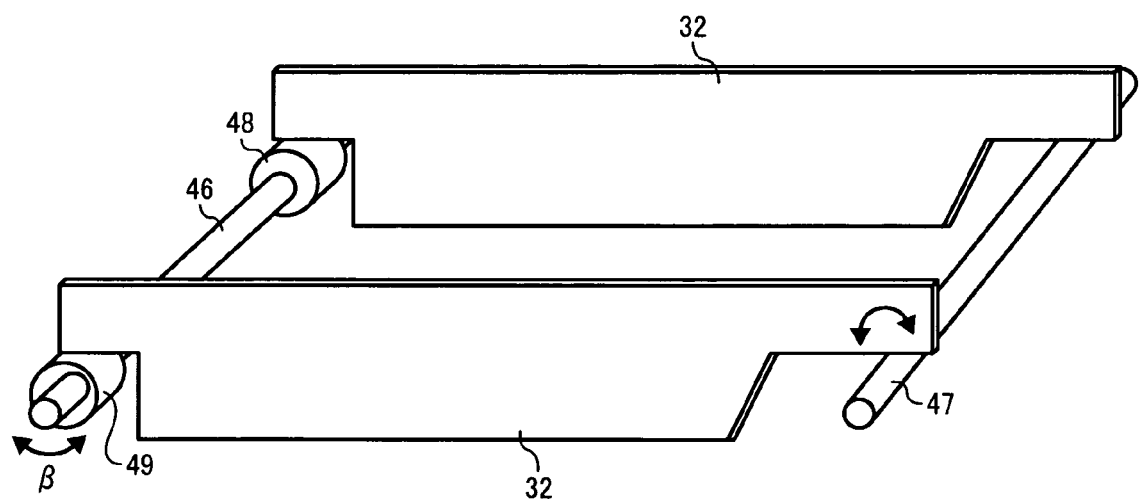
FIG. 10 is a perspective view for illustrating the displacement member for displacing the attitude of the optical element holding member according to the embodiment.

FIG. 10 is a drawing of an example in which shafts 46 and 47 are provided for supporting the optical element holding members 32. As shown in FIG. 10, the shafts 46 and 47 extend between both sides of the pair of the optical element holding members 32 so as to protrude outside both the optical element holding members 32. The one shaft 46 is provided with a collar 48 and an eccentric cam 49 arranged thereon. The collar 48 is arranged at a position of the shaft 46 supporting the optical element holding member 32 on the fixed side. The eccentric cam 49 is arranged at a position of the shaft 46 supporting the optical element holding member 32 on the adjustment side. In such a structure, by rotating the shaft 46, the optical element holding member 32 is rotated (in b-direction) on the plane perpendicular to the principal scanning direction.

The shafts 46 and 47 are made of a ferrous member. Thereby, by providing means for detecting magnetic fluctuations, the torsion amount of the optical element holding members 32 opposing each other can be comprehended.

It is preferable that a structure for adjusting the mirror, such as the eccentric cam 37 shown in FIG. 5B, (a cam mechanism), and a structure for adjusting the optical element holding member 32, such as the eccentric cam 44 shown in FIG. 7A, (a cam mechanism) be arranged on the same side of the optical element holding member 32. Thereby, the adjustment operation can be executed from the same side in the optical writing device 14.

It is also preferable that the optical element holding member 32 be made of a material with a coefficient of linear expansion smaller than that of the support housing 31. Thereby, the misalignment of the irradiating position of the light beam L due to the linear expansion of the support housing 31 can be easily corrected by the adjustment of the optical element holding member 32. The material of the support housing 31 herein may be a resin, for example. The material of the optical element holding member 32 may be a metal having a coefficient of linear expansion smaller than that of the support housing 31, for example.

According to the present invention, various kinds of misalignment due to the torsion of each region of the optical writing device can be adjusted to be incorporated in various kinds of the image forming apparatus having the optical writing device mounted thereon.

The above-described embodiments are illustrative and do not limit the present invention. Thus, numerous additional modifications and variations are possible in light of the above teachings. For example, elements at least one of features of different illustrative and exemplary embodiments herein may be combined with each other at least one of substituted for each other within the scope of this disclosure and appended claims. Further, features of components of the embodiments, such as the number, the position, and the shape, are not limited the embodiments and thus may be preferably set. It is therefore to be understood that within the scope of the appended claims, the disclosure of this patent specification may be practiced otherwise than as specifically described herein.

What is claimed is:

1. An optical writing device for writing electrostatic latent images on an image carrier by irradiating and scanning the image carrier with an optical beam, the optical writing device comprising:
    an optical element;
    a support housing configured to support members constituting the optical writing device;
    a pair of optical-element holding members opposing each other in a principal scanning direction and arranged in the support housing; and
    a displacing member configured to displace at least one of the pair of optical-element holding members relative to the support housing on a plane perpendicular to the principal scanning direction,
    wherein the pair of optical-element holding members are made of a material having a coefficient of linear expansion smaller than that of the support housing.

2. The optical writing device according to claim 1, wherein the displacing member displaces at least one of the pair of optical element holding members in a sub-scanning direction.

3. The optical writing device according to claim 1, wherein the displacing member displaces at least one of the pair of optical element holding members in a direction perpendicular to a sub-scanning direction.

4. The optical writing device according to claim 1, wherein the displacing member displaces at least one of the pair of optical element holding members in a rotational direction of the optical element holding member on a plane perpendicular to the principal scanning direction.

5. The optical writing device according to claim 1, wherein the displacing member displaces at least one of the pair of optical element holding members in at least two directions among a sub-scanning direction, a direction perpendicular to the sub-scanning direction, and a rotational direction of the optical element holding member on a plane perpendicular to the principal scanning direction.

6. The optical writing device according to claim 1, wherein the displacing member is provided integrally with the support housing.

7. The optical writing device according to claim 1, wherein one of the pair of optical element holding members is positioned and fixed to the support housing.

8. The optical writing device according to claim 1, wherein the displacing member includes a shaft extending to both the outsides of the pair of optical element holding members.

9. The optical writing device according to claim 1, wherein the pair of optical element holding members include cross-linking members to have an integral structure.

10. The optical writing device according to claim 1, wherein at least one of the pair of optical element holding members holds the longitudinal direction of the optical element in the principal scanning direction.

11. The optical writing device according to claim 10, wherein the optical element includes a turn-back mirror or a scanning lens.

12. The optical writing device according to claim 10, wherein at least one of the pair of optical element holding members includes an optical element adjustment member configured to adjust the inclination of a scanning line of the optical beam by adjusting an angle of the optical element.

13. The optical writing device according to claim 1, wherein the optical element adjustment member is arranged on a side of at least one of the pair of optical element holding members that is displaced by the displacing member.

14. An image forming apparatus, comprising:
    an optical writing unit including the optical writing device of claim 1, and configured to write electrostatic latent images on an image carrier by irradiating and scanning the image carrier with an optical beam using the optical element; and
    an image forming unit configured to form images by developing the electrostatic latent images on the image carrier and transferring the developed images onto a recording medium.

* * * * *